United States Patent
Grant

(10) Patent No.: US 10,525,979 B1
(45) Date of Patent: Jan. 7, 2020

(54) SYSTEMS AND METHODS FOR GRADUATED RESPONSE TO IMPAIRED DRIVING

(71) Applicant: STATE FARM MUTUAL AUTOMOBILE INSURANCE COMPANY, Bloomington, IL (US)

(72) Inventor: Rosemarie Geier Grant, Ellsworth, IL (US)

(73) Assignee: STATE FARM MUTUAL AUTOMOBILE INSURANCE COMPANY, Bloomington, IL (US)

(*) Notice: Subject to any disclaimer, the term of this patent is extended or adjusted under 35 U.S.C. 154(b) by 148 days.

(21) Appl. No.: 15/725,988

(22) Filed: Oct. 5, 2017

Related U.S. Application Data

(63) Continuation of application No. 14/842,126, filed on Sep. 1, 2015, now Pat. No. 9,884,628.

(51) Int. Cl.
*B60W 40/08* (2012.01)
*B60Q 9/00* (2006.01)

(52) U.S. Cl.
CPC .............. *B60W 40/08* (2013.01); *B60Q 9/00* (2013.01); *B60W 2040/0818* (2013.01)

(58) Field of Classification Search
USPC ........................................................ 701/36
See application file for complete search history.

(56) References Cited

U.S. PATENT DOCUMENTS

| | | |
|---|---|---|
| 2012/0083668 A1 | 4/2012 | Pradeep et al. |
| 2012/0112879 A1* | 5/2012 | Ekchian ............... A61B 5/117 340/5.53 |
| 2013/0226408 A1* | 8/2013 | Fung ..................... B60W 40/09 701/41 |
| 2014/0240132 A1* | 8/2014 | Bychkov ................. A61B 5/18 340/576 |
| 2015/0094914 A1 | 4/2015 | Abreu | |

OTHER PUBLICATIONS

Texas A&M Agrilife Extension, Family and Consumer Services, Detecting Drunk Drivers, Retrieved from the Internet at: <URL:http://fcs.tamu.edu/passenger-safety/library/detecting-drunk-drivers/>.

MotorTrend, Opel Working on Headlights that Illuminate Where Your Eyes Are Looking, Retrieved from the Internet at :<URL:http://www.motortrend.com/news/opel-working-on-headlights-that-illuminate-where-your-eyes-are-looking/>.

Alexandra Mondalek, Devices to Prevent Drunk Driving Seen Saving 59,000 Lives, Bloomberg Business, Retrieved from the Internet at<URL:http://www.bloomberg.com/news/articles/2015-03-19/devices-to-stop-drunk-drivers-could-save-59-000-lives-u-m-says>.

* cited by examiner

Primary Examiner — James M McPherson
(74) Attorney, Agent, or Firm — Marshall, Gerstein & Borun LLP

(57) ABSTRACT

Methods and systems for automatically detecting that a driver of a smart vehicle is impaired and subsequently performing a graduated response are provided. According to certain aspects, vehicle sensors may generate and transmit sensor data indicating that the driver of the smart vehicle is impaired. In response, the smart vehicle may analyze the data and determine a primary response to the indication of impairment. The primary response may be performed by the smart vehicle's control systems. Subsequently, the vehicle sensors may generate and transmit another set of sensor data indicating that the driver of the smart vehicle is impaired. In response, the smart vehicle may analyze the data and determine a secondary response to the indication of impairment. The secondary response may be performed by the smart vehicle's control systems.

17 Claims, 5 Drawing Sheets

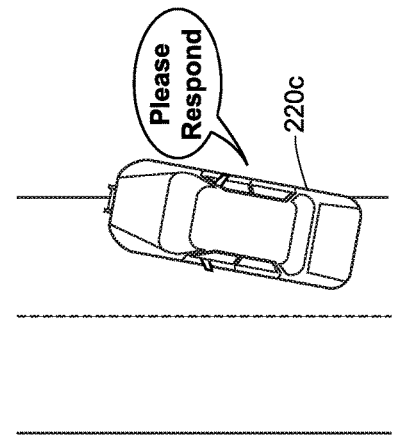
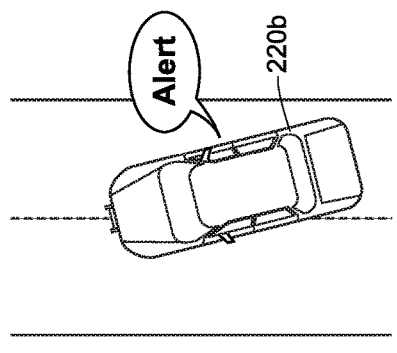
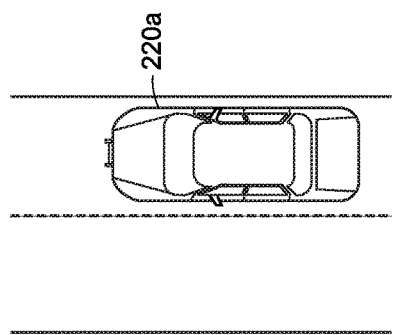
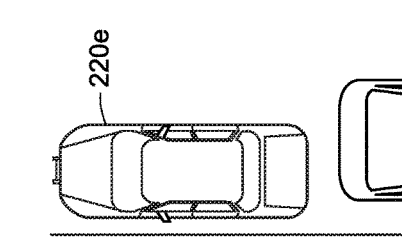
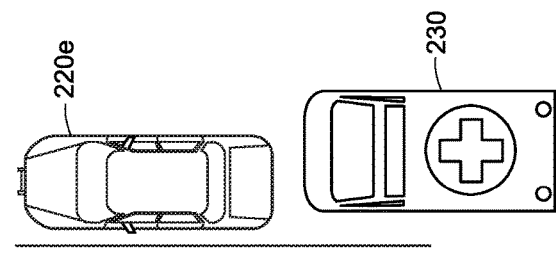

SYSTEMS AND METHODS FOR GRADUATED RESPONSE TO IMPAIRED DRIVING

CROSS-REFERENCE TO RELATED APPLICATIONS

This application is a continuation of U.S. patent application Ser. No. 14/842,126, filed Sep. 1, 2015, entitled "Systems and Methods for Graduated Response to Impaired Driving," the disclosure of which is hereby incorporated herein by reference in its entirety.

FIELD OF THE DISCLOSURE

The present disclosure generally relates to reducing the risks associated with impaired driving, more particularly, to systems and methods that leverage vehicle control systems to detect and respond to impaired driving.

BACKGROUND

Traditionally, vehicles lacked many of the enhanced safety and monitoring features that are now common in smart vehicles. More recently, many vehicles are now equipped with advanced safety monitoring systems, such as lane-departure monitoring and/or blind-spot detection systems. These systems are able monitor conditions exterior to the vehicle and provide simple warnings to the driver. In some systems, the vehicle is even able to automatically brake in order to lessen the impact of a collision. While these responses enhance vehicle safety, they may not be sufficient to reduce risks associated with impaired driving.

For instance, an impaired driver may be unable to respond and/or unaware of the warnings generated by current safety systems. In these scenarios, despite the warnings provided by the vehicle, the impaired driver may continue their unsafe operation of the vehicle. Even in systems with automatic braking, the vehicle may be moving too quickly to bring the vehicle to a safe stop.

In parallel to the development of advanced safety systems, there have been developments into autonomous vehicles. These vehicles are able to safely drive on commercial streets without human intervention. Accordingly, the present embodiments may, inter alia, detect and alleviate the risks associated with impaired driving.

SUMMARY

In one aspect, a computer-implemented method for a graduated response to impaired driving may be provided. The method may comprise (1) receiving, from a plurality of sensors, a first plurality of sensor data, the first plurality of sensor data indicating that a driver of the vehicle is impaired; (2) determining, by one or more processors, a primary response, wherein the primary response comprises warning the driver about an impairment; (3) directing, by the one or more processors, vehicle control systems to perform the primary response; (4) receiving, from the plurality of sensors, a second plurality of sensor data, the second plurality of sensor data indicating that the driver of the vehicle is still impaired after the vehicle control systems execute the primary response; (5) determining, by the one or more processors, a secondary response, wherein the secondary response comprises an interactive response between the vehicle control systems, the plurality of sensors, and the driver to verify that the driver of the vehicle is still impaired; and/or (6) directing, by the one or more processors, the vehicle control systems to perform the secondary response. The method may include additional, fewer, or alternate actions, including those discussed elsewhere herein.

In another aspect, a system for a graduated response to impaired driving may be provided. The system may comprise (i) a memory adapted to store non-transitory computer executable instructions; and/or (ii) one or more processors. The one or more processors may be configured to execute the non-transitory computer executable instructions to cause the system to (1) receive, via a communication bus, a first plurality of sensor data, the first plurality of sensor data indicating that a driver of the vehicle is impaired; (2) determine, by the one or more processors, a primary response, wherein the primary response comprises warning the driver about an impairment; (3) direct, by the one or more processors, vehicle control systems to execute the primary response; (4) receive, via the communication bus, a second plurality of sensor data, the second plurality of sensor data indicating that the driver of the vehicle is still impaired after the vehicle control systems execute the primary response; (5) determine, by the one or more processors, a secondary response, wherein the secondary response comprises an interactive response between the system and the driver to verify that the driver of the vehicle is still impaired; and/or (6) direct, by the one or more processors, the vehicle control systems to execute the secondary response. The system may perform additional, fewer, or alternate actions, including those discussed elsewhere herein.

In still another aspect, a non-transitory computer-readable storage medium storing processor-executable instructions may be provided. When executed, the instructions may cause one or more processors to (1) receive, from a plurality of sensors located in a vehicle, a first set of sensor data, the first plurality of sensor data indicating that a driver of the vehicle is impaired; (2) determine, by the one or more processors, a primary response, wherein the primary response comprises warning the impaired driver about an impairment; (3) direct, by the one or more processors, vehicle control systems to execute the primary response; (4) receive, from the plurality of sensors located in a vehicle, a second set of sensor data; (5) determine, by the one or more processors, that the second set of sensor data indicates that the driver of the vehicle is still impaired after the vehicle control systems execute the primary response; (6) determine, by the one or more processors, a secondary, wherein the secondary response comprises an interactive response between the vehicle control systems, the plurality of sensors, and the driver to verify that the driver of the vehicle is still impaired; and/or (7) direct, by the one or more processors, the vehicle control systems to execute the secondary response. The instructions may cause additional, fewer, or alternate actions, including those discussed elsewhere herein.

BRIEF DESCRIPTION OF THE DRAWINGS

The figures described below depict various aspects of the system and methods disclosed herein. It should be understood that each figure depicts an embodiment of a particular aspect of the disclosed system and methods, and that each of the figures is intended to accord with a possible embodiment thereof. Further, wherever possible, the following description refers to the reference numerals included in the following figures, in which features depicted in multiple figures are designated with consistent reference numerals.

FIG. 2A depicts an exemplary vehicle with an impairment detection application installed, in accordance with some embodiments;

FIG. 2B depicts an exemplary primary response for a vehicle with an impairment detection application installed, in accordance with some embodiments;

FIG. 2C depicts an exemplary secondary response for a vehicle with an impairment detection application installed, in accordance with some embodiments;

FIG. 2D depicts an exemplary tertiary response for a vehicle with an impairment detection application installed, in accordance with some embodiments;

FIG. 2E depicts another exemplary tertiary response for a vehicle with an impairment detection application installed, in accordance with some embodiments;

DETAILED DESCRIPTION

Figure 1:
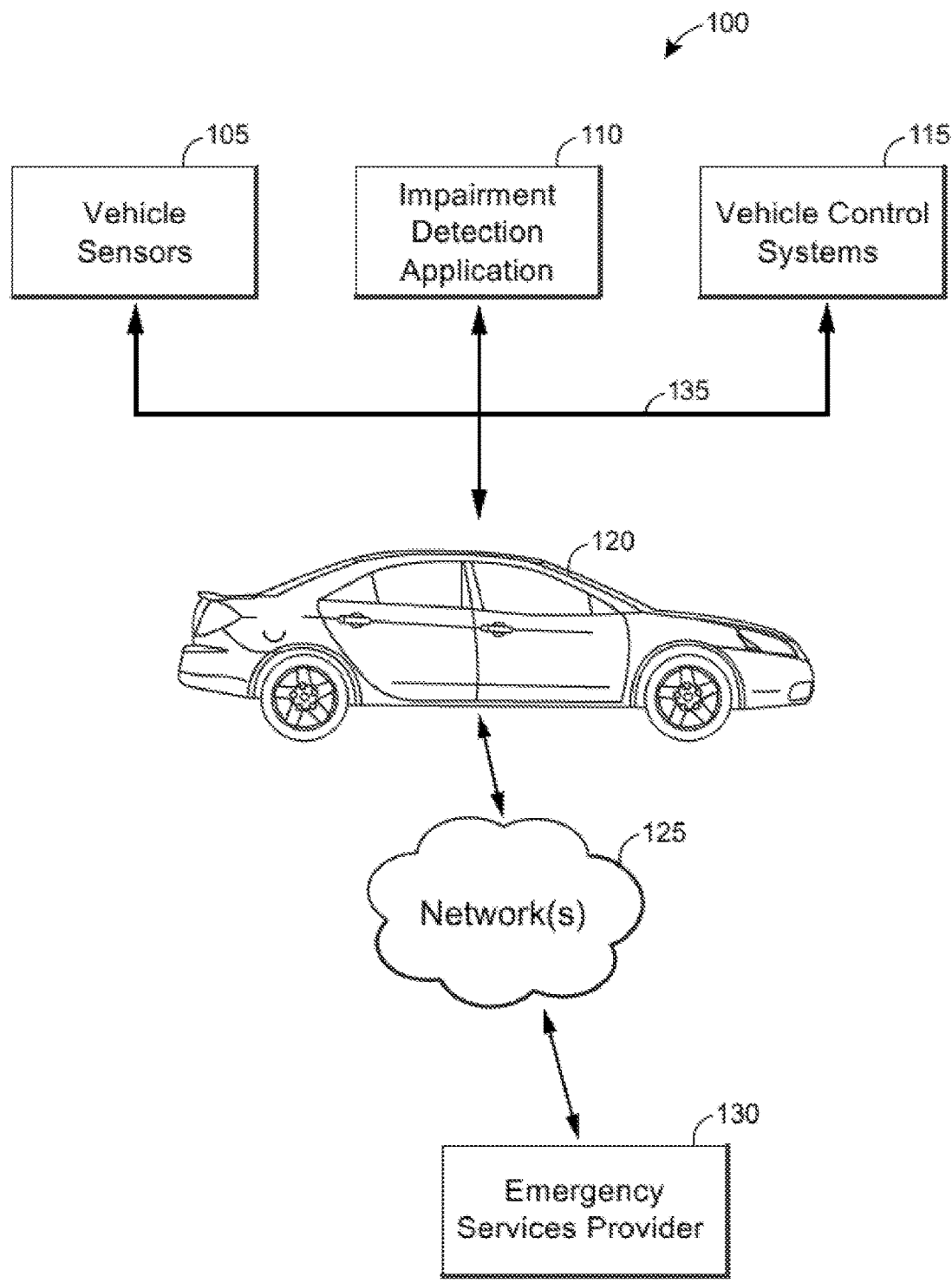
FIG. 1 depicts an exemplary environment including components and entities associated with detecting and responding to impaired driving, in accordance with some embodiments.

The present embodiments may relate to, inter alia, the reduction of risks associated with impaired driving via detecting an impaired driver and executing a graduated response that brings a vehicle to a safe stop. As it is generally used herein, "impaired" may refer to any condition in which a driver of a smart vehicle is unable to safely operate the smart vehicle. For example, a driver may be impaired if the driver is tired, distracted, inebriated, and/or the like. Additionally, the driver may be impaired due to the onset of a severe medical event, such as a heart attack, seizure or stroke. Accordingly, the present embodiments utilize vehicle sensors to detect the impaired condition and then issue commands via vehicle control systems to reduce the risks associated with driving in an impaired condition.

As it relates to the present embodiments, the smart vehicle environment generally has three different component types: (1) vehicle monitoring components (the "vehicle sensors"); (2) vehicle operation components (the "vehicle control systems"); and (3) vehicle application components. In general, the vehicle application components interpret the data generated by the vehicle monitoring components to generate instructions that are executed by the vehicle operation components. The vehicle application components may comprise a plurality of applications and/or modules loaded into the smart vehicle's memory. In some cases, the applications may be loaded into the smart vehicle memory via external ports, such as a USB port or an OBD port. In other cases, the applications may be downloaded wirelessly (such as from an FTP server or an application storefront).

In some embodiments, the vehicle control systems may be accessed via one or more Application Program Interfaces (APIs). Generally, an API enables computer programs to access specific functionality associated with control systems and/or operational components. More particularly, an API may enable programs to utilize specific commands to direct the vehicle control systems to perform a desired function. In the present embodiments, an application may control any of the vehicle operation components via an API. Accordingly, a smart vehicle application may utilize an API command to, for example, lock the smart vehicle's doors, display a message on an infotainment console, or turn on the smart vehicle's headlights.

According to present embodiments, a vehicle application component may comprise an impairment detection application. The impairment detection application may interpret data gathered by the vehicle sensors to determine the presence of a driver impairment. In response, the impairment detection application may dynamically generate instructions that are executed by the vehicle control systems to mitigate the risks associated with impaired driving. In some embodiments, the instructions comprise commands utilizing a plurality of APIs corresponding to a plurality of vehicle operational components. In an example, the vehicle sensors may include an eye-gaze monitor that is able to detect when a driver is not looking at the road. In response to eye-gaze monitor transmitting data indicative of the driver not looking at the road for a threshold duration, the impairment detection application may determine that the appropriate response is to cause a warning noise to emit from the vehicle's speakers. Accordingly, the impairment detection application may generate a command that utilizes the smart vehicle's audio output API and transmit the command to the vehicle control systems. In response, the vehicle control system directs the command to the vehicle's audio output components to cause the warning noise to emit from the vehicles speakers.

In order to provide the most appropriate response to mitigate the risks of the driver operating the smart vehicle in the impaired condition, the impairment detection application may create different tiers of responses. For example, one tier of responses may comprise providing the driver with a warning that they might be impaired, such as by reciting an audio warning, causing a steering mechanism to vibrate, and/or displaying a visual alert. This tier of responses may be generally unobtrusive and provide an opportunity to correct any unsafe driving patterns. If the impairment detection application detects that the driver is still impaired after the initial response, the impairment detection application may then utilize a response from the next tier of responses. This tier may include responses that require the driver to interact with the smart vehicle systems to obtain greater confidence that the driver is actually impaired.

In response to detecting that the driver's interaction with the smart vehicle systems indicates that the driver is impaired, the impairment detection application may then utilize a response in a third tier of responses. In this tier, the impairment detection application may generate a response that causes the smart vehicle to reach a safe stop. In order to cause the vehicle to stop safely, the impairment detection application may override any manual steering and braking inputs to automatically control the vehicle. Further, in order to prevent stranding the driver, an emergency contact and/or an emergency service provider may be contacted and informed as to the location of the smart vehicle.

The present embodiments therefore address a challenge inherent to the technological field of vehicle automation; namely, the need to balance the reduction of the risks associated with impaired drivers with the avoidance of "false positives" incorrectly identifying the driver as impaired. It is particularly important to avoid false positives when preventing manual control of a moving vehicle. For example, if a driver briefly swerved because, for example, the driver sneezed, it would be inappropriate to cause the vehicle to pull over. The present embodiments address this challenge through a system of graduated responses that prevent the smart vehicle from over-reacting to a minor event. In particular, the present embodiments utilize the functionality of the smart vehicle environment to solve the false positive problem. As a result, the present embodiments are necessarily rooted in the smart vehicle environment to overcome the noted shortcomings that arise due to the smart vehicle environment.

Similarly, the present embodiments provide an improvement to a technical field, namely, vehicle automation. Instead of the present embodiments merely being performed by hardware components using basic functions, the present embodiments employ complex steps that go beyond the mere concept of simply retrieving and combining data using a computer. In particular, the hardware components compile vehicle sensor data, analyze the sensor data, determine an appropriate response based on the current response tier, and dynamically adjust vehicle operation, among other functionalities. This combination of elements impose meaningful limits in that the operations are applied to improve vehicle automation by overriding the conventional response to detecting that a driver is operating a vehicle in an impaired manner. As a result, the present embodiments cause the vehicle to respond to the impaired vehicle operation in a manner that provides a greater reduction of the risks associated with impaired driving while still preventing a disproportionately severe response.

Additionally, the present embodiments may be utilized by an insurance provider. For example, a provider of automobile insurance may offer a discount to policyholders in response to enabling the present graduated response capabilities within an insured smart vehicle. Similarly, the insurer may require that all drivers diagnosed with certain health issues (e.g., narcolepsy, epilepsy, diabetes, history of stroke or heart attack, etc.) enable the graduated response capabilities to be insured while driving. This use of insurance-based incentives may increase the usage of graduated response capabilities, thereby lowering the risk of collisions involving vehicles insured by the insurance provider. This may reduce the insurance provider's overall liabilities, enabling the insurance provider to lower the insurance rates offered to all potential customers.

I. Exemplary Environment for Detecting Impaired Drivers

FIG. 1 depicts an exemplary environment 100 associated with detecting an impaired driver and determining an appropriate response. Although FIG. 1 depicts certain entities, components, and devices, it should be appreciated that additional or alternate entities and components are envisioned.

As illustrated in FIG. 1, the environment 100 may include a smart vehicle 120. While the smart vehicle 120 is depicted as a car, the smart vehicle may comprise any smart road vehicle, such as a motorcycle, truck, can-am, and/or the like. The smart vehicle 120 may include internal computer components, such as vehicle sensors 105, an impairment detection application 110, and vehicle control systems 115. Although environment 100 only depicts the smart vehicle 120, it should be appreciated that there may be any number of smart vehicles 120 containing respective vehicle sensors 105, impairment detection applications 110, and vehicle control systems 115.

The vehicle sensors 105 may include any electronic device integrated into the smart vehicle 120 that monitors an operational condition of the smart vehicle 120. For example, the vehicle sensors 105 may include a lane monitor, an eye-gaze monitor, a tire pressure monitor, a seatbelt monitor, a braking monitor, an acceleration monitor, a speed monitor, an audio monitor, and/or any other similar monitor that monitors and/or records an operational condition of the smart vehicle 120. Sensor data generated by the vehicle sensors 105 may be output onto a communication bus 135 forming a stream of data describing the recent operation of the smart vehicle 120. It should be appreciated that the vehicle sensors 105 may be fixedly attached to the smart vehicle 120, and therefore, exclude personal electronic devices (e.g., phones, tablets, smart watches, etc.) and/or removable on-board diagnostic (OBD) monitors.

The impairment detection application 110 may monitor the communication bus 135 for sensor data output by the vehicle sensors 105. Accordingly, the impairment detection application 110 may "receive" the sensor data when the impairment detection application 110 detects that the vehicle sensors 105 have output the sensor data onto the communication bus 135. The impairment detection application 110 may analyze the sensor data to determine that the driver of the smart vehicle 120 is impaired. In response, the impairment detection application 110 may transmit, via the communication bus 135, an instruction that directs the vehicle control systems 115 to perform an action. It should be appreciated that although the environment depicts the communication bus 135, it is envisioned that in some embodiments the communication bus 135 may actually comprise a plurality of communication buses. For example, in some embodiments, a communication bus may be utilized to receive and analyze sensor data and another communication bus may be utilized to direct the vehicle control systems 115 to perform actions. In this example, the communication bus via which impairment detection application 110 receives the sensor data may be different than the communication bus via which the impairment detection application transmits instructions.

The vehicle control systems 115 may monitor the communication bus 135 to detect any instructions transmitted by the impairment detection application 110. In response, the vehicle control systems 115 may cause a corresponding vehicle operation component to perform the action. As an example, the vehicle controls systems may be able to control power locks, display information on an infotainment console or an augmented reality and/or Head-Up Display (HUD) in a vehicle windshield, control headlights or other vehicle lighting systems, and/or output audio data through vehicle speakers. Accordingly, if the vehicle control systems 115 detect an instruction to display a warning on an infotainment console, the vehicle control systems 115 may cause the corresponding to warning to be displayed on the infotainment console. In some embodiments, each vehicle operation component monitors the communication bus 135 to detect the presence of an instruction requiring the respective vehicle operation component to perform an action. Additionally, the vehicle control systems may be able to control vehicle operation through autonomous navigation systems that utilize the vehicle's automatic steering and braking controls. In this example, if the vehicle control systems 115 detect an instruction to pull the smart vehicle 120 over to the side of the road, the vehicle control systems 115 may dynamically control any vehicle operation components required to realize the instruction. It should be appreciated that in some embodiments, this functionality is supported through interactions with another vehicle application that generates self-navigation instructions in compliance with a plurality of APIs corresponding to the vehicle operation components.

In some scenarios, the impairment detection application 110 may determine that the appropriate response comprises alerting, via a communication network 125, an emergency services provider 130 as to the driver's impaired state. The communication network 125 may facilitate any type of data communication between the smart vehicle 120 and the emergency services provider 130 via any standard or technology (e.g., GSM, CDMA, TDMA, WCDMA, LTE, EDGE, OFDM, GPRS, EV-DO, UWB, IEEE 802, WiMAX, and/or others). Accordingly, the vehicle control systems 115 may include wireless transceivers adapted for communication via the communication network 125.

In some embodiments, the emergency services provider 130 may comprise any of an emergency medical technician, a fire department, a police department, and/or any other emergency services provider. The transmitted alert may include a location and/or bearing of the smart vehicle 120, a description of the impairment, and/or any other information relevant to providing an appropriate emergency response. In response, the emergency services provider 130 may dispatch an appropriate response unit to the location of the smart vehicle 120. Additionally, the smart vehicle 120 may store contact information for an emergency contact that the driver of the smart vehicle 120 prefers to be notified in emergency situations. Accordingly, the alert generated by the impairment detection application 110 may be transmitted to the emergency contact in addition to the emergency services provider 130. The exemplary environment 100 may include additional, fewer, or alternate equipment or components, including those discussed elsewhere herein.

II. Exemplary Graduated Response

Referring to FIGS. 2A-2E, illustrated is a series of depictions of an exemplary graduated response. In the depicted scenario, a driver of vehicles 220a-e experiences a severe medical event while driving. It should be appreciated that the scenario depicted in FIGS. 2A-2E is exemplary and many other types of graduated responses are envisioned.

Starting with FIG. 2A, depicted is the vehicle 220a traversing a road under normal vehicle operating conditions. In the depicted scenario, the vehicle 220a is travelling within its lane and sensor data does not indicate that the driver of the vehicle 220a is impaired.

Turning to FIG. 2B, depicted is the vehicle 220b after the driver experiences a severe medical event while driving. For example, the driver may have suffered a stroke and is unable to properly control the vehicle 220b. As depicted, while experiencing the stroke, the driver caused the vehicle 220b to swerve sharply to the left.

An impairment detection application running on the vehicle 220b may detect that the driver is now impaired. In this scenario, the impairment detection application may detect the impaired condition due to the sudden swerving motion. Additionally, the impairment detection application may detect the impaired condition due to sensors that monitoring conditions associated with the driver. For example, the vehicle sensors may indicate that the driver removed his hands from the steering wheel and/or that his eyes moved in an unusual pattern. Regardless of how the impairment was detected, the impairment detection application may cause the vehicle 220b to perform a primary response. In the depicted scenario, the primary response comprises an audio warning as indicated by the speech bubble.

Turning to FIG. 2C, depicted is the vehicle 220c, wherein the vehicle 220c has swerved sharply to right sometime after the primary response. For example, the driver may still be experiencing the stroke and has not yet regained control of the vehicle 220c.

An impairment detection application running on the vehicle 220c may detect that the driver did not resume normal vehicle operation within a threshold time of issuing the primary response. As a result, the impairment detection application may initiate a secondary response to confirm that the driver is too impaired to drive. In the depicted scenario, the secondary response comprises a request that the driver responds, as indicated by the speech bubble. In response to issuing the secondary response, the impairment detection application may receive audio data indicating the driver's response to the secondary response.

Turning to FIG. 2D, depicted is the vehicle 220d after the vehicle 220d was automatically stopped as part of a tertiary response. For example, an impairment detection application may have determined that audio data received in response to a secondary response indicated that the driver needed medical attention (e.g., the driver responded by saying "help me"). As a result, the impairment detection application generated and transmitted instructions to cause the vehicle 220d to pull over to the side of the road.

Turning to FIG. 2E, depicted is an ambulance responding to an emergency medical situation detected by the vehicle 220e. For example, an impairment detection application may have detected that a driver of the vehicle 220e recently suffered a stroke and, as part of a tertiary response, alerted the ambulance to the emergency medical situation. In response, the ambulance was dispatched to the vehicle 220e to provide emergency care to the driver.

III. Exemplary Impairment Communication

Figure 3:
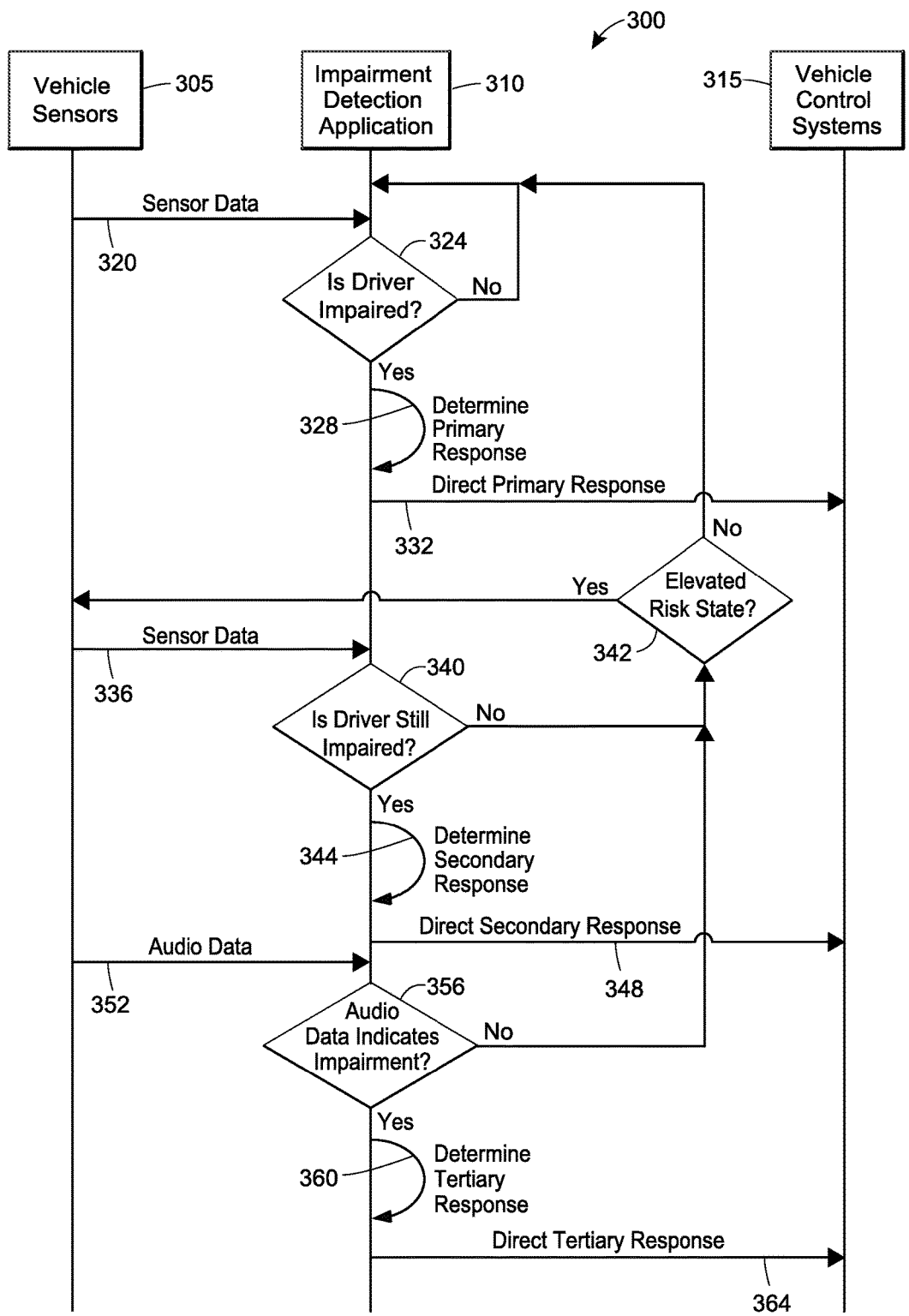
FIG. 3 depicts an exemplary signal diagram for responding to an impaired driver, in accordance with some embodiments.

Referring to FIG. 3, illustrated is a signal diagram 300 associated with generating a response to detecting that a driver of a smart vehicle (such as the smart vehicle 120 as depicted in FIG. 1) is impaired. In particular, FIG. 3 may include vehicle sensors 305 (such as the vehicle sensors 105 as described with respect to FIG. 1), an impairment detection application 310 (such as the impairment detection application 110 as described with respect to FIG. 1), and vehicle control systems 315. The impairment detection application 310, the vehicle sensors 305, and the vehicle control systems 315 may be located within the smart vehicle.

The signal diagram 300 may begin when the vehicle sensors transmit (320) sensor data representative of an operational condition associated with the smart vehicle and/or the driver. The sensor data may be transmitted via a communication bus, such as the communication bus 135 as described with respect to FIG. 1. It should be appreciated that the vehicle sensors 305 may transmit the sensor data in response to a trigger event (e.g., detecting that the smart vehicle is drifting out of a lane) or at a regular interval (e.g., transmitting a speed of the smart vehicle every 500 ms).

Upon receiving the sensor data, the impairment detection application may determine (324) whether the received sensor data indicates that the driver is impaired. For example, the sensor data may indicate that the driver and/or the smart vehicle is exhibiting particular behaviors associated with drunk driving and/or tired driving, such as straddling a lane marker for an extended period of time, tailgating, swerving within a lane, an inability to focus one's gaze and/or other eye movements corresponding to an impaired state, driving at a speed outside of a threshold range of a current speed limit and/or other similar behaviors. It should be appreciated that a single action indicative of impairment (e.g., a lane departure) may not be sufficient to indicate that the driver is impaired. Accordingly, the impairment detection application 310 may only determine that the driver is impaired if the action occurs repeatedly within a threshold duration. Further, the sensor data may also indicate the driver is experiencing a severe medical event. For example, some smart vehicles may include biometric sensors that can detect abnormal health conditions corresponding to the driver and/or sensors that monitor body posture to determine if that the driver's body is moving in an abnormal manner.

If the impairment detection application 310 determines that the driver is not impaired ("NO"), then the impairment detection application 310 may await the reception of further sensor data generated by the vehicle sensors 305. Conversely, if the impairment detection application 310 determines that the driver is impaired ("YES"), then the impairment detection application 310 may determine (328) a primary response to the impaired state. The primary response may be an initial response that informs the driver about their potentially impaired state. In some embodiments, the primary response may comprise reciting an audio warning, causing a steering mechanism to vibrate, and/or displaying a visual alert on an infotainment console or windshield HUD. For example, the audio warning and/or visual alert may state that the driver appears to driving in an impaired manner and should pay more attention to the road.

After the impairment detection application 310 determines a primary response, the impairment detection application 310 may then direct (332) the vehicle control systems 315 to perform and/or execute the primary response. According to embodiments, the impairment detection application 310 may generate instructions and/or commands in accordance with APIs associated with a plurality of vehicle cooperation components that comprise the vehicle control systems 315. As an example, in order recite computer generated language through the smart vehicle's speakers, a generated instruction may take the form of, for example, speakerOut("Text to be recited goes here"). The impairment detection application 310 may then transmit the generated instructions onto the communication bus. In response, the vehicle control systems 315 may direct the command to appropriate vehicle operation components to execute the instructions that comprise the primary response.

In addition to performing the primary action, in response to determining that the first set of sensor data indicates that the driver is impaired, the impairment detection application 310 may enter an elevated risk state associated with a higher than normal likelihood that the driver is impaired. This elevated risk state may expire after a threshold duration (e.g., five minutes). In the elevated risk state, the reception of sensor data indicating that the driver is impaired may trigger a secondary response. Conversely, if the impairment detection application 310 is not in the elevated risk state, the reception of sensor data indicating that the driver is impaired may trigger a primary response.

Sometime after the vehicle control systems 315 perform the primary response, the vehicle sensors 305 may transmit (336) a second set of sensor data to the impairment detection application 310. In response, the impairment detection application 310 may analyze the second set of sensor data to determine (340) whether the driver is still impaired. The impairment detection application 310 may determine impairment through actions that are substantially similar to those described with respect to step 324.

In some embodiments, in order to provide the driver sufficient time for the driver to correct any driving patterns indicative of an impaired state, it should be appreciated that the impairment detection application 310 may wait for the expiration of a grace period (i.e., a threshold amount of time) prior to analyzing the second set of sensor data. The duration of the grace period may vary depending on the specific behaviors detected. For example, if the driver is driving at erratic or unusual speeds, the grace period duration may be thirty seconds. As another example, if the driver was straddling the center line for an extended period of time, the duration of the grace period may be shorter than in the case of speeding. As a result, in this example the grace period may only be ten seconds. As still another example, if the impairment detection application 310 detected that the driver was experiencing a seizure, the duration of the grace period may be shorter still, for example, two seconds. This variable grace period duration furthers the previously stated benefit of reducing the risk of inappropriately triggering the most severe responses. To this end, drivers are given greater opportunity to correct less risky impaired driving behaviors to reduce the overall likelihood any single smart vehicle performs a tertiary response prematurely. Similarly, this variable grave period enables the impairment detection module 310 to respond to more imminent risks more quickly.

If the impairment detection application 310 determines that the driver is not still impaired ("NO"), then the impairment detection application 310 may await the reception of further sensor data generated by the vehicle sensors 305. At this point, the impairment detection application 310 may determine (342) if it is still in the elevated risk state. To this end, if the impairment detection application 310 may determine if the threshold duration since the impairment detection application 310 entered the elevated risk state has expired. Accordingly, if the threshold duration has not expired, the impairment detection application 310 is still in the elevated risk state. If the impairment detection application 310 is in the elevated risk state ("YES"), then the impairment detection application 310 may await the reception of further sensor data from the vehicle sensors 305 such that if the sensor data contains data indicating that the driver is impaired, the impairment detection application 310 determines a secondary response. Conversely, if the impairment detection application 310 is not in the elevated risk state ("NO"), then the impairment detection application 310 may await the reception of further sensor data from the vehicle sensors 305 such that if the sensor data contains data indicating that the driver is impaired, the impairment detection application 310 determines a primary response.

Returning to decision 340, if the impairment detection application 310 determines that the driver is still impaired ("YES"), then the impairment detection application 310 may determine (344) a secondary response. The secondary response may be intended to verify the automatic impairment determination through an interactive response between the smart vehicle and the driver. To this end, the secondary response may be a request that the driver recites a verbal statement and/or interacts with a user interface associated with the smart vehicle. Accordingly, the secondary response may comprise both commands that direct the vehicle control systems 315 to request the driver interaction and commands that direct the vehicle control systems 315 and/or the vehicle sensors 305 to monitor and digitally record the driver's response to the request.

In some implementations, the response requested by the impairment detection application 310 may vary based on the specific detected impairment. For example, if the impairment detection application 310 determined that the driver is tired, the secondary response may be designed such that the driver replies to a query with a sentence. Accordingly, in this example, the secondary response may comprise, for example, an audio output of "Please say your full address," as well as causing an audio input to digitally record the driver's response. On the other hand, if the impairment detection application 310 determined that the driver is experiencing a severe medical event, the secondary response may be designed to quickly verify that the driver needs medical attention. Accordingly, in this example, the secondary response may comprise and audio output such as "Do you need immediate medical assistance?," as well as causing an audio input to digitally record the driver's response.

Once the impairment detection application 310 determines the secondary response based on the particular type of impairment, the impairment detection application 310 may direct (348) the vehicle control systems 315 to perform and/or execute the secondary response. The impairment detection application 310 may direct the vehicle control systems 315 to perform the secondary response through actions that are substantially similar to those described with respect to step 332.

As part of the secondary response, the vehicle sensors 305 may have recorded audio data capturing the driver's response to the secondary response. Accordingly, the vehicle sensors 305 may transmit (352) the audio data to the impairment detection application 310. In response, the impairment detection application may determine (356) whether the audio data confirms that the driver is impaired. This determination may vary based on the secondary response. For example, if the secondary response required the driver to recite a sentence, the determination may be based on whether the audio data indicates that the driver speaking with slurred speech, mumbling, speaking incoherently, and/or exhibiting other speech patterns associated with impairments. Conversely, if the secondary response required the driver to confirm a need for medical attention, the determination may be based on whether the driver assented to the need and/or was unable to provide any response to the secondary response.

If the impairment detection application 310 determines that the audio data does not confirm that the driver is impaired ("NO"), then the impairment detection application 310 may await the reception of further sensor data generated by the vehicle sensors 305. The response to the "NO" determination may comprise actions that are substantially similar to those described with respect to decision 342.

Conversely, if the impairment detection application 310 determines that the audio data confirms that the driver is impaired ("YES"), then the impairment detection application 310 may determine (360) a tertiary response. The tertiary response may be causing the smart vehicle to safely stop moving and/or pull over. For example, the impairment detection application 310 may determine that there is a nearby parking lot or that the side of a road that the smart vehicle is currently traversing is safe and/or has sufficient room on the shoulder. Accordingly, the tertiary response may comprise navigating the smart vehicle to the parking lot or the shoulder of the road. In scenarios where the tertiary response comprises pulling over on the shoulder of a road, the tertiary response may further include turning on headlights, hazard lights, overhead cabin lights, and/or performing other actions that increase the visibility of the smart vehicle. It should be appreciated that if the smart vehicle is already stopped (i.e., the smart vehicle is at a red light), the tertiary response may cause the smart vehicle to begin moving again prior to reaching the safe stop.

In addition to safely stopping the vehicle, the tertiary response may also comprise informing third parties as to the driver's impairment. For example, if the driver is experiencing a severe medical event, the tertiary response may include alerting an emergency medical technician and/or other emergency medical services about the driver's condition. In this example, to increase response time, the tertiary response may comprise transmitting the alert prior to, and/or concurrently with, safely stopping the vehicle. Similarly, if the impairment detection application 310 determines that the driver is likely drunk, the tertiary response may comprise alerting a law enforcement entity as to the driver's impairment. In either case, the alert may inform the appropriate emergency services provider about the smart vehicle's current location and/or intended stopping location.

Once the impairment detection application 310 determines the tertiary response, the impairment detection application 310 may direct (364) the vehicle control systems 315 to perform and/or execute the tertiary response. The impairment detection application 310 may direct the vehicle control systems 315 to perform the tertiary response through actions that are substantially similar to those described with respect to step 332. The signal diagram 300 may include additional, fewer, or alternate actions, including those discussed elsewhere herein.

IV. Exemplary Method of Impairment Detection

Figure 4:
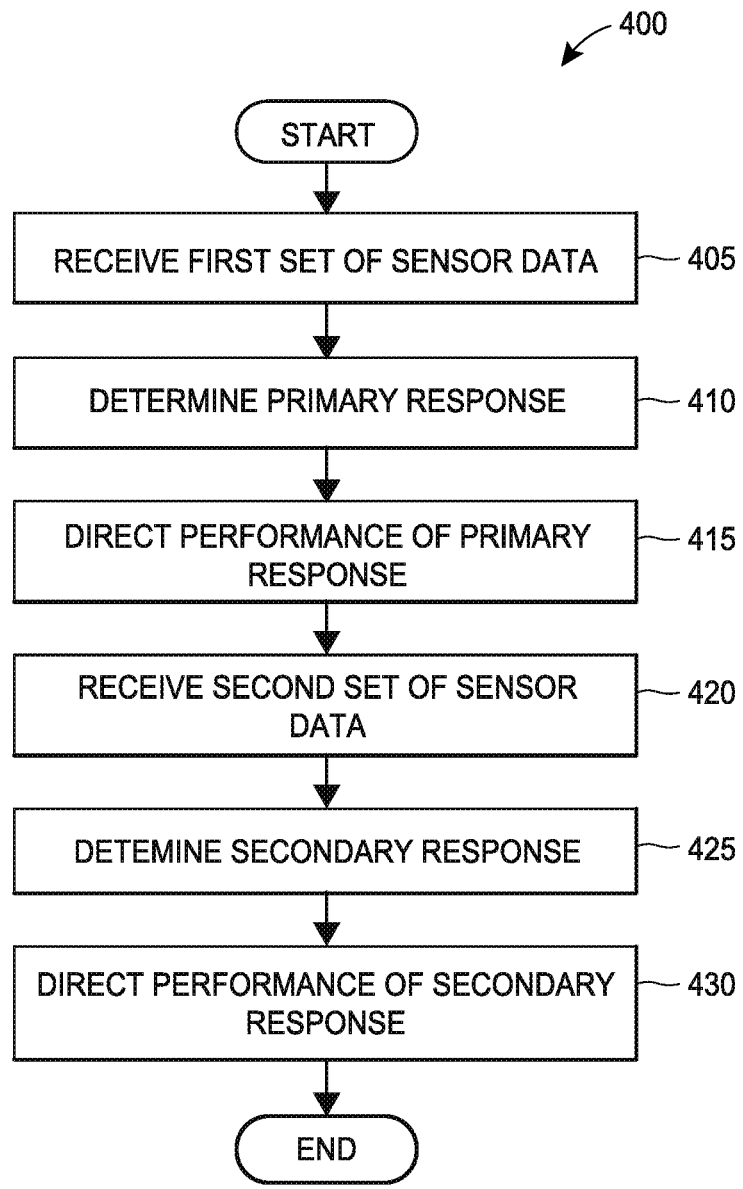
FIG. 4 depicts an exemplary flow diagram for responding to an impaired driver, in accordance with some embodiments.

Referring to FIG. 4, depicted is a block diagram of an exemplary method 400 for responding to an impaired driver. The method 400 may be facilitated by an impairment detection application (such as the impairment detection application 110 as depicted in FIG. 1) in communication with a plurality of vehicle sensors (such as the vehicle sensors 105 as depicted in FIG. 1), and vehicle control systems (such as the vehicle control systems 115 as depicted in FIG. 1). The impairment detection application, the vehicle sensors, and the vehicle control systems may be located within a smart vehicle (such as the smart vehicle 120 as depicted in FIG. 1).

The method 400 may begin by the impairment detection application receiving (Block 405) a first set of sensor data from the plurality of vehicle sensors. The impairment detection application may analyze the first set of sensor data to determine if the first set of sensor data indicates that the driver of the smart vehicle is likely impaired. In response, the impairment detection application may determine (Block 410) an appropriate primary response to alert the driver about any unsafe driving patterns. After determining the primary response, the impairment detection application may direct (Block 415) the vehicle control systems to perform the primary response.

Sometime after the vehicle control systems perform the primary response, the impairment detection application may receive (Block 420) a second set of sensor data from the plurality of vehicle sensors. The impairment detection application may analyze the second set of sensor data to determine if the second set of sensor data indicates that the driver of the smart vehicle is still likely impaired. In response, the impairment detection application may determine (Block 425) a secondary response to verify if the driver is actually impaired. The secondary response may require the driver to interact with the smart vehicle (e.g., by reciting a verbal statement) to provide additional data to the impairment detection application. After determining the secondary response, the impairment detection application may direct (Block 430) the vehicle control systems to perform the secondary response.

Although not depicted, the method 400 may also include the impairment detection application receiving data from the plurality of vehicle sensors indicative of the driver's response to the secondary response. The impairment detection application may analyze this data to determine if it verifies that the driver is in fact impaired. In response, the impairment detection application may then determine a tertiary response to cause the smart vehicle to reach a safe stop. After determining the tertiary response, the impairment detection application may direct the vehicle control systems to perform the tertiary response. The method 400 may include additional, fewer, or alternate actions, including those discussed elsewhere herein.

V. Exemplary Smart Vehicle

Figure 5:
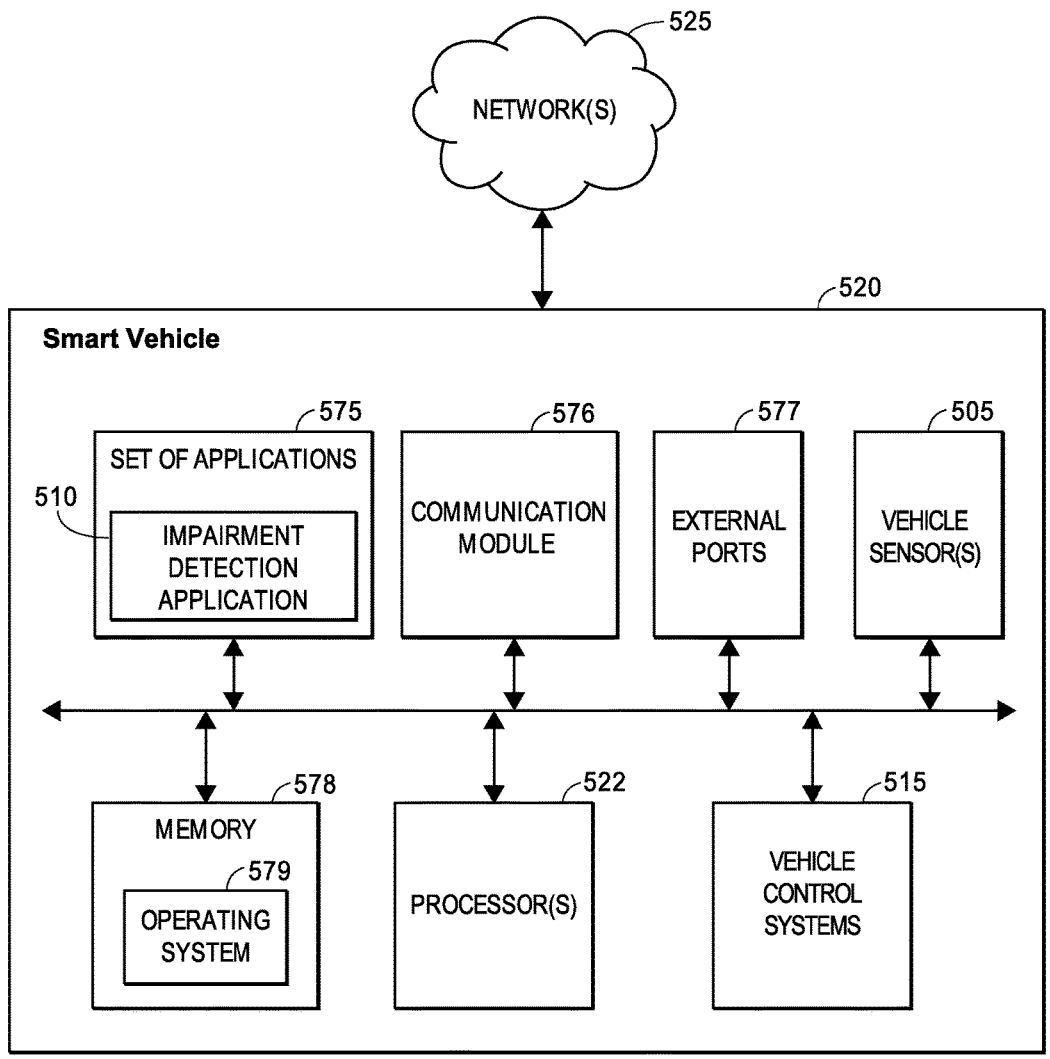
FIG. 5 is a block diagram of a smart vehicle, in accordance with some embodiments.

FIG. 5 illustrates a diagram of an exemplary smart vehicle 520 (such as the smart vehicle 120 as discussed with respect to FIG. 1) in which the functionalities as discussed herein may be implemented. It should be appreciated that the smart vehicle 520 may be operated by a driver, as discussed herein.

The smart vehicle 520 may include one or more vehicle sensors that monitor a plurality of vehicle operation characteristics. For example, the vehicle sensors 505 may include an accelerometer, a gyroscope, a GPS, image sensors, audio sensors, and/or the like. Sensor data generated by the vehicle sensors 505 may be output onto the communication bus 535. Additionally, the smart vehicle 520 may also include vehicle control systems 515 that control the performance of the smart vehicle 520. For example, the vehicle control systems 515 may include systems that control power locks, steering, braking, navigation, lighting systems, and/or other types of vehicle systems.

The smart vehicle 520 may include one or more processors 522 as well as a memory 578. The memory 578 may store an operating system 579 capable of facilitating the functionalities as described herein. The smart vehicle 520 may also store a set of applications 575 (i.e., machine readable instructions). For example, one of the set of applications 575 may be an impairment detection application 510 configured to determine whether the driver is impaired and determine an appropriate response. In particular, the impairment detection application 510 may receive sensor data from the vehicle sensors 505 and transmit instructions and/or commands to the vehicle control systems 515 via the communication bus 535. It should be appreciated that the smart vehicle 520 may include other applications that are not depicted.

The one or more processors 522 may interface with the memory 578 to execute the operating system 579 and the set of applications 575. The memory 578 may include one or more forms of volatile and/or non-volatile, fixed and/or removable memory, such as read-only memory (ROM), electronic programmable read-only memory (EPROM), random access memory (RAM), erasable electronic programmable read-only memory (EEPROM), and/or other hard drives, flash memory, MicroSD cards, and others.

The smart vehicle 520 may further include a communication module 576 configured to communicate data via one or more networks 525. According to some embodiments, the communication module 576 can include one or more transceivers (e.g., WWAN, WLAN, and/or WPAN transceivers) functioning in accordance with IEEE standards, 3GPP standards, or other standards, and configured to receive and transmit data via the networks 525. For example, the communication module 576 may transmit, via the networks 525, an alert to emergency service providers. Additionally, the smart vehicle 520 may include external ports 577 to load applications into the set of applications 575 and/or update the operating system 579. The external ports may include any suitable port usable for transferring machine readable instructions, such as USB ports, OBD ports, optical disc readers, and/or like.

In general, a computer program product in accordance with an embodiment may include a computer usable storage medium (e.g., standard random access memory (RAM), an optical disc, a universal serial bus (USB) drive, or the like) having computer-readable program code embodied therein, wherein the computer-readable program code is adapted to be executed by the one or more processors 522 (e.g., working in connection with the operating system 579) to facilitate the functions as described herein. In this regard, the program code may be implemented in any desired language, and may be implemented as machine code, assembly code, byte code, interpretable source code or the like (e.g., via Python, or other languages, such as C, C++, Java, Actionscript, Objective-C, Javascript, CSS, XML).

VI. Additional Considerations

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Additionally, certain embodiments are described herein as including logic or a number of routines, subroutines, applications, or instructions. These may constitute either software (e.g., code embodied on a non-transitory, machine-readable medium) or hardware. In hardware, the routines, etc., are tangible units capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules may provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and may operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods or routines described herein may be at least partially processor-implemented. For example, at least some of the operations of a method may be performed by one or more processors or processor-implemented hardware modules. The performance of certain of the operations may be distributed among the one or more processors, not only residing within a single machine, but deployed across a number of machines.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the description. This description, and the claims that follow, should be read to include one or at least one and the singular also includes the plural unless it is obvious that it is meant otherwise.

This detailed description is to be construed as exemplary and does not describe every possible embodiment, as describing every possible embodiment would be impractical, if not impossible. One could implement numerous alternate embodiments, using either current technology or technology developed after the filing date of this application.

What is claimed:

1. A computer-implemented method for a graduated response to impaired driving, the method comprising:
    receiving, from a plurality of vehicle sensors over a communication bus, a plurality of sensor data indicating that a driver of a vehicle is impaired;
    determining, by one or more processors of a vehicle application component executing a vehicle impairment application, a first response, the first response including an interactive response between vehicle control systems, the plurality of vehicle sensors, and the driver to verify that the driver of the vehicle is impaired;
    generating, by the one or more processors, a first instruction to perform the first response, the first instruction generated in accordance with an Application Program Interface (API) of the vehicle control systems of the vehicle;
    directing, by the one or more processors, the vehicle control systems to perform the first response by transmitting the generated first instruction over the communication bus;
    determining, by the one or more processors, that the interactive response indicates the driver is still impaired;
    determining, by the one or more processors, a second response, wherein the second response comprises causing the vehicle to stop;
    generating, by the one or more processors, a second instruction to perform the second response, the second instruction generated in accordance with an API of a self-navigation application being executed by a vehicle application component, the self-navigation application configured to interpret the second instruction to generate one or more instructions in accordance with an API of the vehicle control systems of the vehicle, wherein the API of the self-navigation application is not an API of the vehicle control systems; and
    directing, by the one or more processors, the vehicle control systems to override manual steering and braking inputs to cause the vehicle to stop by transmitting the generated second instruction over the communication bus.

2. The computer-implemented method of claim 1, wherein the second response occurs after performing a primary response, and wherein performing the primary response comprises:
    determining, by the one or more processors, the primary response wherein the primary response includes a warning to the driver about an impairment;

generating, by the one or more processors, a primary response instruction to perform the primary response, the primary response instruction generated in accordance with an API of vehicle control systems of the vehicle; and directing, by the one or more processors, the vehicle control systems to perform the primary response by transmitting the generated primary response instruction over the communication bus.

3. The computer-implemented method of claim 2, wherein the directing the vehicle control systems to perform the primary response comprises:

directing, by the one or more processors, the vehicle control systems to recite an audio warning, cause a steering mechanism to vibrate, or display a visual alert.

4. The computer-implemented method of claim 1, wherein the plurality of vehicle sensors are sensors that are fixedly attached to the vehicle and wherein the plurality of vehicle sensors exclude personal electronic devices and removable on-board diagnostic (OBD) monitors.

5. The computer-implemented method of claim 1, wherein receiving the plurality of sensor data comprises:

receiving, from the plurality of vehicle sensors, at least one of an indication that the vehicle has departed from a lane, an indication that eye movements corresponding to the driver of the vehicle indicate an impaired state, an indication that the vehicle is driving at a speed outside of a threshold range of a current speed limit, or an indication that the driver of the vehicle is experiencing one of a seizure, a heart attack, or a stroke.

6. The computer-implemented method of claim 1, wherein directing the vehicle control systems to perform the first response comprises:

directing, by the one or more processors, the vehicle control systems to recite a request that the driver of the vehicle provides a verbal statement indicating that the driver of the vehicle is not impaired.

7. The computer-implemented method of claim 6, further comprising:

receiving, from the plurality of vehicle sensors located in the vehicle, data representative of the verbal statement made by the driver;

determining, by the one or more processors, that the verbal statement indicates that the driver of the vehicle is impaired.

8. The computer-implemented method of claim 7, wherein determining that the verbal statement indicates that the driver of the vehicle is impaired comprises:

analyzing, by the one or more processors, the data representative of the verbal statement to detect characteristics of the verbal statement indicating at least one of a slurred speech pattern or a statement indicating a need for medical assistance.

9. The computer-implemented method of claim 1, wherein determining the second response further comprises:

determining, by the one or more processors, the second response, wherein the second response further comprises transmitting, to at least one of an emergency medical service or a law enforcement entity, an alert indicating that the driver of the vehicle is impaired.

10. A system for a graduated response to impaired driving, the system comprising:

a memory adapted to store non-transitory computer executable instructions, the instructions including an impairment detection application; and one or more processors of a vehicle application component configured to execute the non-transitory computer executable instructions to cause the system to:

receive, from a plurality of vehicle sensors and via a communication bus, a plurality of sensor data indicating that a driver of a vehicle is impaired;

determine, by the one or more processors, a first response, the first response including an interactive response between the system and the driver to verify that the driver of the vehicle is impaired;

generate, by the one or more processors, a first instruction to perform the first response, the first instruction generated in accordance with an application programming interface (API) of vehicle control systems of the vehicle;

direct, by the one or more processors, the vehicle control systems to execute the first response by transmitting the generated first instruction over the communication bus;

determine, by the one or more processors, that the interactive response indicates the driver is still impaired;

determine, by the one or more processors, a second response, wherein the second response comprises causing the vehicle to stop;

generate, by the one or more processors, a second instruction to perform the second response, the second instruction generated in accordance with an API of a self-navigation application being executed by the vehicle application component, the self-navigation application configured to interpret the second instruction to generate one or more instructions in accordance with an API of the vehicle control systems of the vehicle, wherein the API of the self-navigation application is not an API of the vehicle control systems; and direct, by the one or more processors, the vehicle control systems to override manual steering and braking inputs to cause the vehicle to stop by transmitting the generated second instruction over the communication bus.

11. The system of claim 10, wherein the second response occurs after performing a primary response, and wherein to perform the primary response, the one or more processors are configured to execute the non-transitory computer executable instructions to cause the system to:

determine, by the one or more processors, a primary response including a warning to the driver about an impairment;

generate, by the one or more processors, a primary response instruction to perform the primary response, the primary response instruction generated in accordance with an API of the vehicle control systems of the vehicle; and direct, by the one or more processors, the vehicle control systems to execute the primary response by transmitting the generated primary response instruction over the communication bus.

12. The system of claim 11, wherein to direct the vehicle control systems to execute the primary response, the one or more processors are further configured to execute the non-transitory computer executable instructions to cause the system to:

direct, by the one or more processors, the vehicle control systems to recite an audio warning, cause a steering mechanism to vibrate, or display a visual alert.

13. The system of claim 10, wherein to direct the vehicle control systems to execute the first response, the one or more processors are further configured to execute the non-transitory computer executable instructions to cause the system to:
  direct, by the one or more processors, the vehicle control systems to recite a request that the driver of the vehicle provides a verbal statement indicating that the driver of the vehicle is not impaired.

14. The system of claim 13, wherein the one or more processors are further configured to execute the non-transitory computer executable instructions to cause the system to:
  receive, via the communication bus, data representative of the verbal statement made by the driver;
  determine, by the one or more processors, that the verbal statement indicates that the driver of the vehicle is impaired.

15. The system of claim 14, wherein to determining that the verbal statement indicates that the driver of the vehicle is impaired, the one or more processors are further configured to execute the non-transitory computer executable instructions to cause the system to:
  analyze, by the one or more processors, the data representative of the verbal statement to detect characteristics of the verbal statement indicating at least one of a slurred speech pattern or a statement indicating a need for medical assistance.

16. The system of claim 10, wherein to determine the second response, the one or more processors are further configured to execute the non-transitory computer executable instructions to cause the system to:
  determine, by the one or more processors, the second response, wherein the second response further comprises transmitting, to at least one of an emergency medical service or a law enforcement entity, an alert indicating that the driver of the vehicle is impaired.

17. A non-transitory computer-readable storage medium storing processor-executable instructions, the instructions (i) including an impairment detection application, and (ii) when executed, cause one or more processors to:
  receive, from a plurality of sensors located in a vehicle and via a communication bus, a set of sensor data;
  determine, by the one or more processors, that the set of sensor data indicates that a driver of the vehicle is impaired;
  determine, by the one or more processors, a first response including an interactive response between vehicle control systems, the plurality of sensors, and the driver to verify that the driver of the vehicle is impaired;
  generate, by the one or more processors, a first instruction to perform the first response, the first instruction generated in accordance with an application programming interface (API) of the vehicle control systems of the vehicle;
  direct, by the one or more processors, the vehicle control systems to execute the first response by transmitting the generated first instruction over the communication bus;
  determine, by the one or more processors, that the interactive response indicates the driver is still impaired;
  determine, by the one or more processors, a second response, wherein the second response comprises causing the vehicle to stop;
  generate, by the one or more processors, a second instruction to perform the second response, the second instruction generated in accordance with an API of a self-navigation application being executed by a vehicle application component, the self-navigation application configured to interpret the second instruction to generate one or more instructions in accordance with an API of the vehicle control systems of the vehicle, wherein the API of the self-navigation application is not an API of the vehicle control systems; and
  direct, by the one or more processors, the vehicle control systems to override manual steering and braking inputs to cause the vehicle to stop by transmitting the generated second instruction over the communication bus.

* * * * *